(12) United States Patent
Yang et al.

(10) Patent No.: US 7,383,259 B2
(45) Date of Patent: Jun. 3, 2008

(54) METHOD AND SYSTEM FOR MERGING WAFER TEST RESULTS

(75) Inventors: Keng-Chia Yang, Chuang-Hwa (TW);
Chiu Wen Jen, Hsinchu (TW);
Chung-Yu Chang, Taichung (TW);
Kuo-Rung Hsiao, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 575 days.

(21) Appl. No.: 10/861,132

(22) Filed: Jun. 4, 2004

(65) Prior Publication Data

US 2005/0278329 A1    Dec. 15, 2005

(51) Int. Cl.
*G06F 17/30* (2006.01)
(52) U.S. Cl. ............................................. 707/5; 707/6
(58) Field of Classification Search .............. 707/1–10, 707/100–104.1, 200–206; 726/25
See application file for complete search history.

(56) References Cited

U.S. PATENT DOCUMENTS

| | | | | |
|---|---|---|---|---|
| 5,497,486 A | * | 3/1996 | Stolfo et al. | 707/7 |
| 5,717,915 A | * | 2/1998 | Stolfo et al. | 707/5 |
| 6,883,101 B1 | * | 4/2005 | Fox et al. | 726/25 |

* cited by examiner

*Primary Examiner*—Diane Mizrahi
(74) *Attorney, Agent, or Firm*—Thomas, Kayden, Horstemeyer & Risley

(57) ABSTRACT

A system for merging product characterization information with a characterized product employs a merging rule database and a product characterization database. A merging processor receives the product characterization information and the merging criteria to create a characterization information result. The characterization information result is created by extracting a trigger merging rule form the merging rule database and determining whether the trigger merging rule has been met to initiate merging the product characterization information with the product. If the products have no characterizations that meet the merging criteria, a union map and an intersection map for the characterized product are created. The merged product characterization information is connected to the product by marking the product to identify it as having met the merging criteria.

36 Claims, 6 Drawing Sheets

RULE DATABASE

| TRIGGER PART => | PN-###### | TRIGGER SORT NO => | SN-## |
|---|---|---|---|
| MERGE SORT NUMBER => | SN-##### | MERGE BD FILE => | PN-###### FILE NAME |
| NA MAX COUNT => | #### | | |
| RULE SEQUENCE | RULE | TRIGGER BD FILE => | PN-###### FILE NAME |
| | | INPUT SORT LIST => | SORT #1, SORT #2, SORT R |
| | | INPUT NOTCH LIST => | UP / DOWN / LEFT / RIGHT |
| 3 | $0 0 $1 | | |
| 6 | * * $2 | | |
| 4 | $R 0 $1 | | |
| 1 | $G 0 $1 | | |
| 2 | $B 0 $1 | | |
| 5 | $NA * 99 | | |

FIG. 3

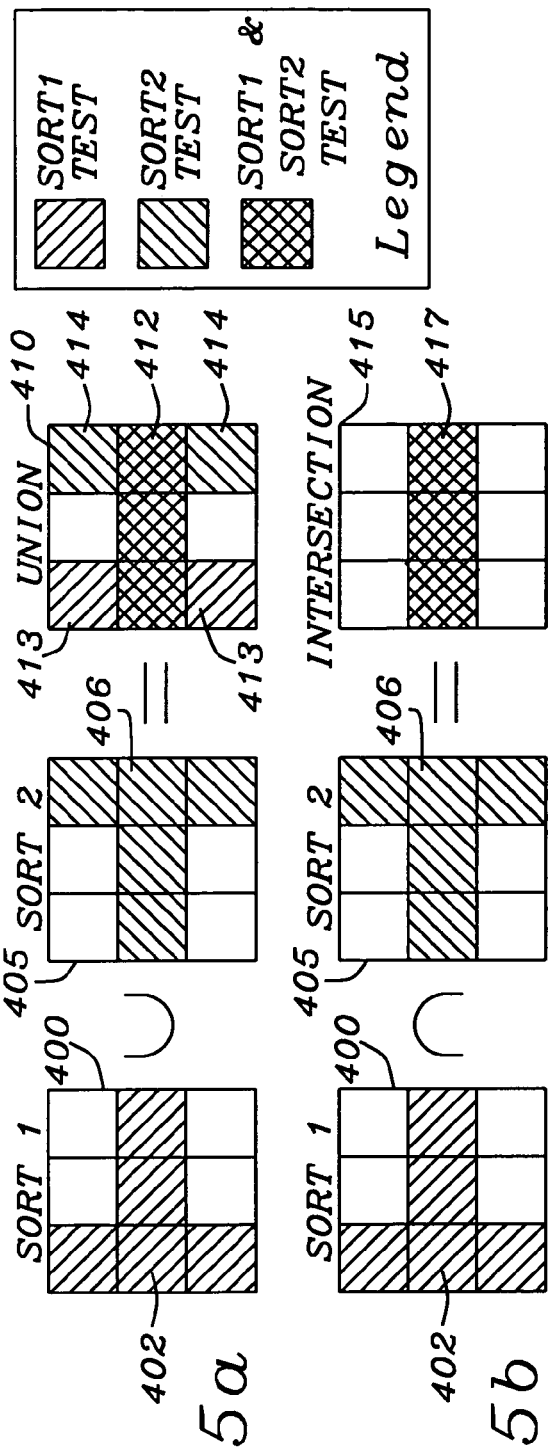
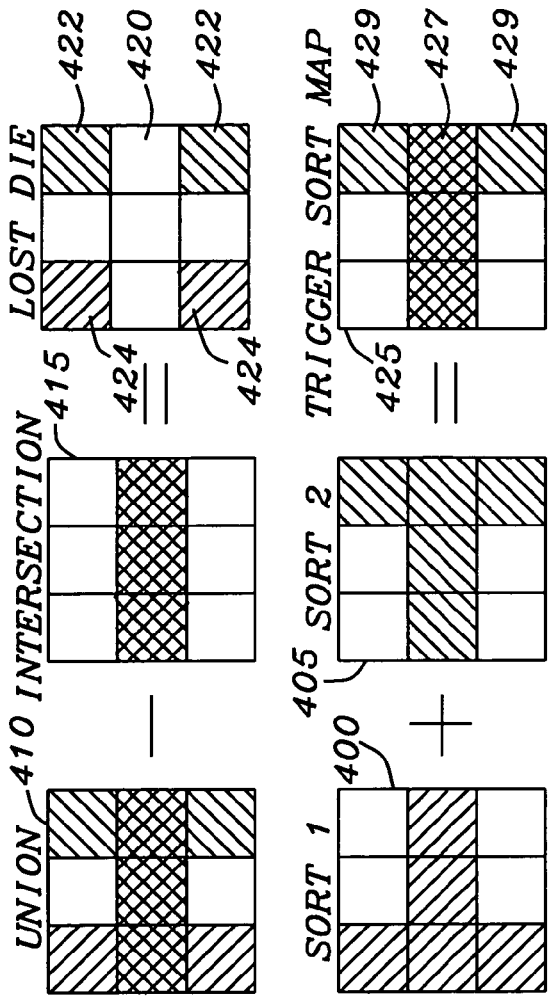
FIG. 5a  FIG. 5b  FIG. 5c  FIG. 5d

METHOD AND SYSTEM FOR MERGING WAFER TEST RESULTS

BACKGROUND OF THE INVENTION

1. Field of the Invention

This invention relates generally to systems and methods for merging product characterization information with a characterized product. More particularly, this invention relates to systems and methods for merging integrated circuit test characterization data with characterized integrated circuit die formed on a semiconductor wafer.

2. Description of Related Art

In enterprises such as integrated circuit wafer processing companies commonly referred to as "silicon foundries", products (integrated circuit die formed on wafers) are tested and the results merged with the products for shipment to the customer. In the example of the integrated circuit wafer, the products (integrated circuit die) may be non-functioning or function at different performance levels. The test information provides characterization data for each integrated circuit die. The test information is used to sort or bin the integrated circuit die when the wafers are scribed to dice the individual integrated circuit die from the wafer.

Refer now to FIG. 1 to review the merging of the product test characterization data for products like integrated circuit die on a wafer of the prior art. A wafer 5 is processed to form the integrated circuit die. During and after the processing, the tester 10 characterizes the wafer 5 to provide a parametric and functional description of the operation of the integrated circuit die formed on the wafer 5. The parametric data maybe voltage versus current curves for active devices to describe DC parameters or the results of ring oscillators to describe AC performance of the wafers. Further, the actual functioning of the integrated circuit die may be determined. The tester 10 creates a circuit probe result file 16 that is maintained by a data retention device 15 such as a magnetic or electro-optical disk.

The data retention device 15 is in communication 20 with a customer or product engineer 30 through the engineering data analysis system 25. The engineering data analysis system 15 provides the necessary evaluation to create a yield analysis for each lot of product (wafers) 5 produced. The data retention device 15 is further in communication 37 with the circuit probe server system 35 that provides the control and testing programs for the tester 10. The circuit probe server system 35 is in communication with a program retention device 40 that contains the control and testing programs for the tester 10. The program retention device 40 further has a converter program process 50 stored for the conversion of the circuit probe result file 16 to formats desired by the customer 30. The converter program process 50 is constructed of multiple product characterization data converters 51, 52, 53, and 54 that retrieve the circuit probe result file for a product associated with the individual product characterization data converters 51, 52, 53, and 54 to generate a merged circuit probe result file 46 that is retained by the data retention device 45. The data retention device 46 is in communication 55 with the engineering data analysis system 25 to provide the merged result circuit probe file 46 for the yield analysis. The data retention device is also in communication 46 to a wafer ink probe 60 which marks the wafer 65 with the necessary binning and yield information. This is effectively the merging of the product with the product characterization data for use by the customer to determine the appropriate binning and yield of the product (wafer) 65.

All of the product characterization data converters 51, 52, 53, and 54 are constructed based on product (wafer) 5 descriptions, since each product type is unique and may have differing merging rules. This structure is not conducive to real-time processing of the product characterization data result file 16 for merging with the product and thus must be executed on a batch basis. In products such a dynamic random access memory (DRAM), the product may have a failure on its first test and characterization by the tester 10 and then be repaired. Upon its repair, the DRAM wafer is then retested and the merging of the product characterization data must be based on the results of two test and characterization operations. Again, this does not permit real-time processing of the merging of the characterization data with the product.

U.S. Pat. No. 6,049,803 (Szalwinski) describes a method for interactive documentation of a database framework and data continued in a relational database, such as, an engineering database with data related to the manufacturing and testing of semiconductor devices. Multiple documentation levels are provided such that each documentation level includes a view of the database framework with at least one documentation level including a high level view of the database framework. The documentation levels include descriptions and definitions of the views of the database framework, and the views of the database framework include descriptions and definitions of entities, attributes and schema of the data in the database. One documentation level is displayed that includes the view of the database framework. User selectable items are displayed on the display device at each documentation level. The user selectable items represent other documentation levels or other views of the database framework. The other documentation levels are accessed by actuating one of the user selectable items. The documentation levels and the views of the database framework are based on one or more driving tables included in the database. The driving tables can be modified or updated; thereby modifying or updating the documentation levels and the views of the database framework.

U.S. Pat. No. 5,841,893 (Ishikawa, et al.) provides data analysis stations respectively for a probing tester and an automatic particle inspection machine. In the data analysis station, the coordinates on which the disposition of the die are described on a product basis are equal to those on which the locations of the defects are described. Further, the station provides a function to determine which of the die have the defects. These data analysis stations are connected through a communication line. The data is analyzed on a dice basis, resulting in being able to grasp the relationship between how the defects are caused and the product character of the dice.

U.S. Pat. No. 5,761,064 (La, et al.) teaches an automated wafer defect management system in which wafer defect data is collected from wafer inspection instruments. The wafer defect data is converted into a standard data format and made available through a central database system to workstations for review, analysis, and evaluation.

U.S. Pat. No. 6,434,725 (Sommer, et al.) describes a method and system for semiconductor testing using yield correlations between global and class parameters for semiconductor die. The system and method provide for including test data for multiple tests on each of multiple die. A global parameter is assigned to each dice as a quality measure based on the test data for that dice. Values for parameter classes are determined where each parameter class represents a parameter measured for each dice tested. A correlation between the values of the parameter classes and the global parameter values for the die are then determined. The correlation for each of the parameter classes is compared to identify at least one parameter class that detracts from dice yield.

SUMMARY OF THE INVENTION

An object of this invention is to provide a system and method for merging product characterization information with a characterized product.

Another object of this invention is to provide a system and method for merging product characterization information with a characterized product where rules governing this merging are retained in a rule database.

To accomplish at least one of these objects, a system for merging product characterization information with a characterized product has a product characterization database which is in communication with a product characterizing device to receive the product characterization information for the characterized product. In a preferred embodiment of this invention, the characterized product is wafers with integrated circuit die formed. The characterizing device is a test system that provides parametric and functional tests of the integrated circuit die formed on the wafer.

The system includes a merging rule database that describes a criteria for merging the product characterization information with the characterized product. In the case of an integrated circuit wafer, the merging criteria is determined by the results from tests performed by the tester and the sorting or binning of the integrated circuit die.

A merging processor is in communication with the product characterization database to receive the product characterization information and the merging rule database to receive the merging criteria to create a characterization information result. The characterization information result is created by first extracting a trigger merging rule form the merging rule database and determining whether the trigger merging rule has been met to initiate a merging of the product characterization information with the product. If the trigger merging rule has been met, a merging criteria sort type map and a merging criteria sort number map are extracted. The merging criteria sort type map determines which of the products has certain characteristics and the merging criteria sort number map determines which of the products is classified according to grades of the merging criteria. A merged product characterization information is created as defined by the grades of the merging criteria.

If the products have no characterization that meets the merging criteria, a union map and an intersection map for the characterized product are created. The union map is formed by identifying the characterized product that meets at least one of a plurality of sub-criteria of the merging criteria. The intersection map is formed by identifying the characterized product that meets all of the plurality of sub-criteria of the merging criteria. The merged product characterization information is created according to the union map.

If the union map and the intersection map indicate that too many of the characterized products do not meet the merging criteria, an error handling process is initiated.

The merged product characterization information is connected to the product by marking the product to identify it as having met the merging criteria. In an integrated circuit die formed on a wafer, the binning results are marked on each integrated circuit dice meeting certain criteria described in the merging data.

BRIEF DESCRIPTION OF THE DRAWINGS

FIG. 3 is a diagram of the structure of the product characterization information data rule merging database of FIG. of this invention.

FIGS. 5a-5d are illustrations of the types of merging methods employed to determine the product characterization information data to be merged with the product of this invention.

DETAILED DESCRIPTION OF THE INVENTION

A computer integrated manufacturing system of this invention retrieves product characterization information data from a characterization device such as an integrated circuit probe tester. A merging processor receives the product characterization information data and extracts merging criteria from a merging rule database. The merging processor merges the product characterization information data according to the merging criteria to create merged result characterization information data. This merged result characterization information data is then combined with the product and delivered to the customer. The merging criteria is developed from a union and/or an intersection of a mapping of the product characterization information data for multiple tests. A product may be tested then repaired and then tested again. The first testing results and the second testing results are used to form a union of a mapping of the results to provide the total characterization of the product. Alternately, a given product may have been tested and repaired, but some of that product was unrepairable and some other product has failed in a second testing, the intersection of a mapping of the first testing and the second testing determines whether that product has been lost or failed. Further, the merging criteria maybe a particular sort mapping developed by the customer, where the product is sorted into categories or bins dependent upon the results of the product characterization information data.

Figure 1:
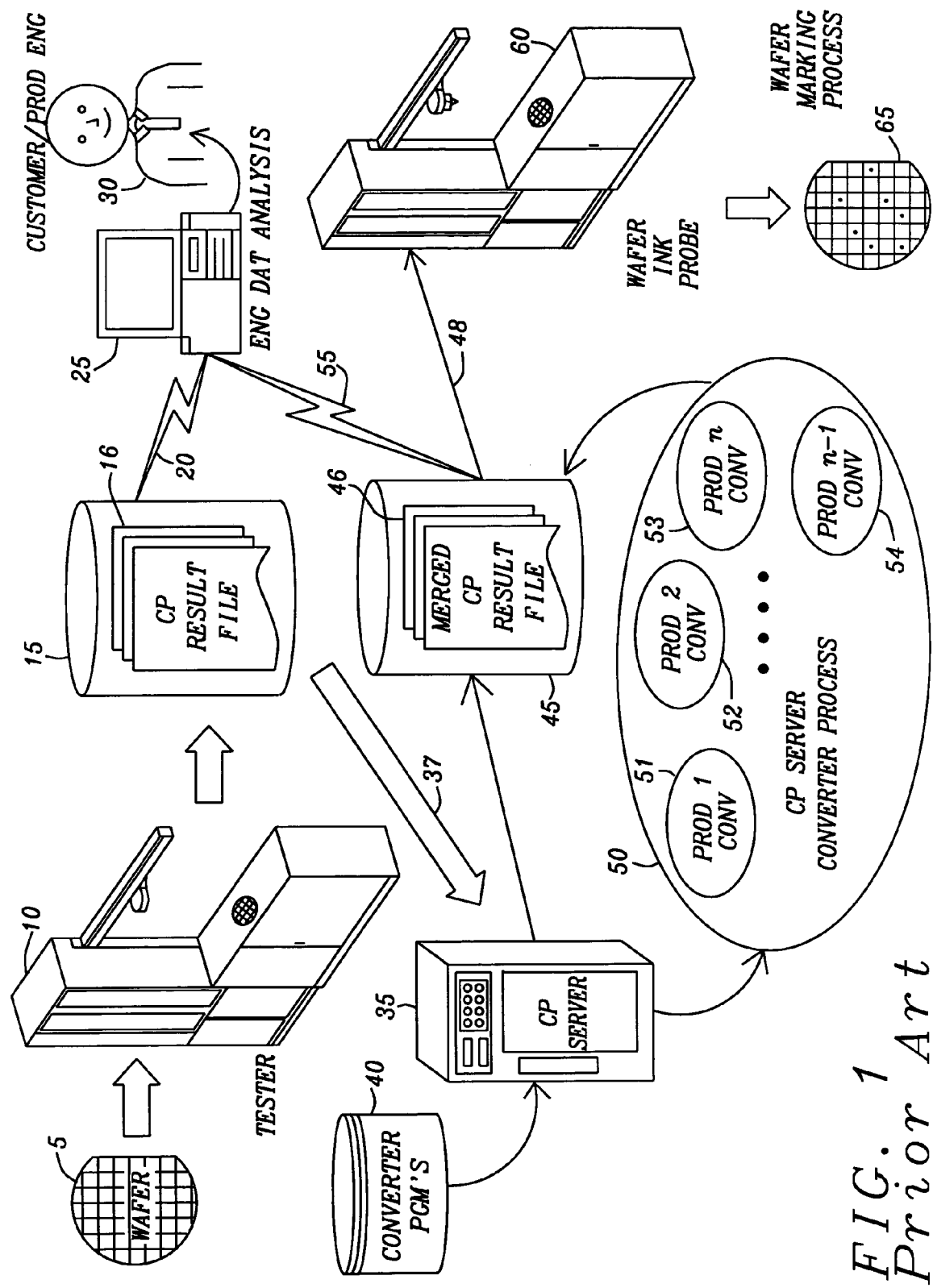
FIG. 1 is a system diagram of a computer integrated manufacturing system for merging product characterization information data with a product of the prior art.
Figure 2:
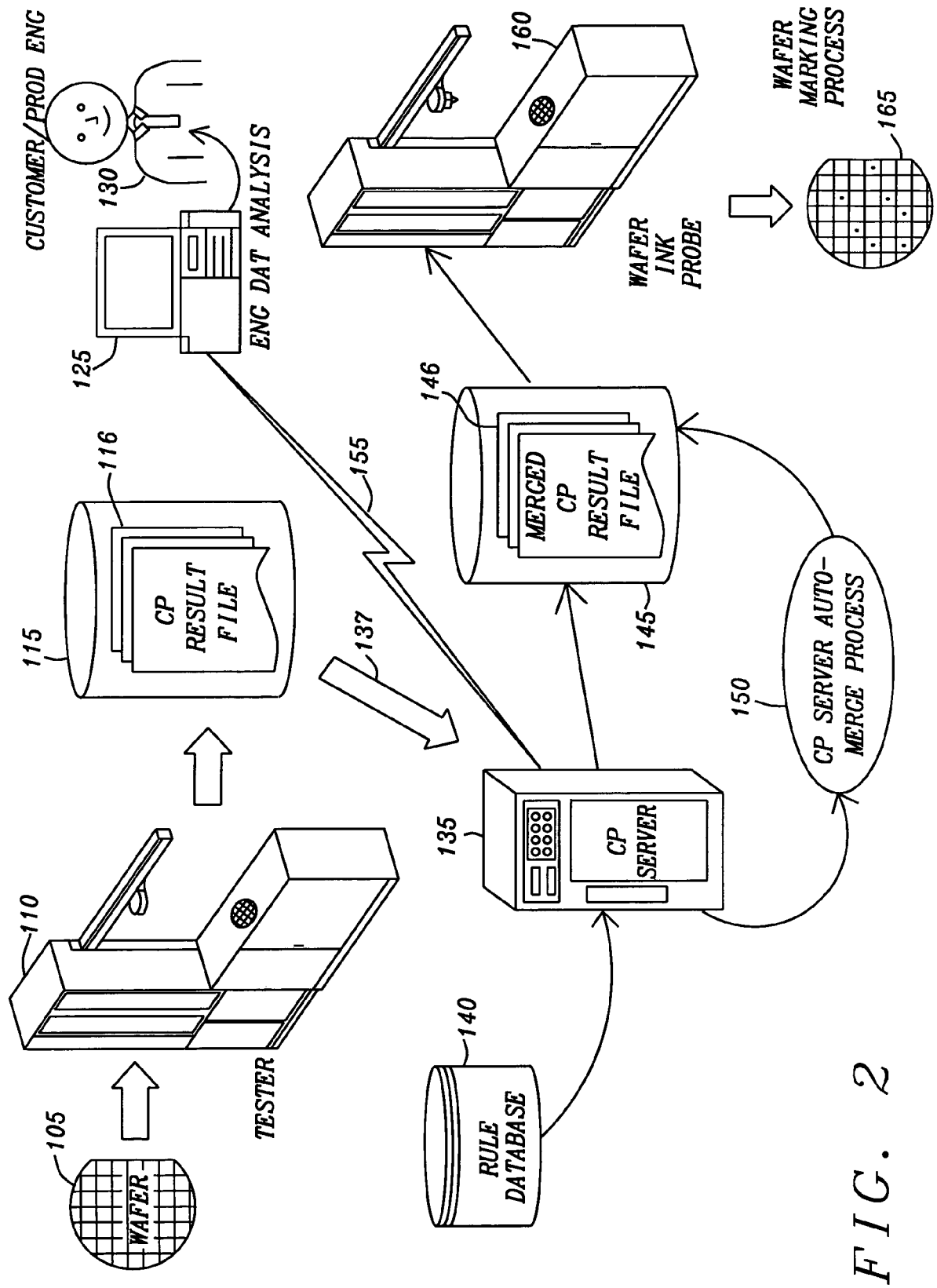
FIG. 2 is a system diagram of a computer integrated manufacturing system for merging product characterization information data with a product of this invention.

Refer now to FIG. 2 for a discussion of the merging of the product test characterization data for products like integrated circuit die on a wafer of this invention. A wafer 105 is processed to form the integrated circuit die. During and after the processing, the tester 110 characterizes the wafer 105 to provide a parametric and functional description of the operation of the integrated circuit die formed on the wafer 105. The parametric data maybe voltage versus current curves for active devices to describe DC parameters or the results of ring oscillators to describe AC performance of the wafers. Further, the actual functioning of the integrated circuit die maybe determined. The tester 110 creates a circuit probe result file 116 that is maintained by a data retention device 115 such as a magnetic or electro-optical disk. The circuit probe result file 116 provides the product test characterization information data.

The data retention device 115 is in communication 137 with the circuit probe server system 135 to transfer the circuit probe result file 116 to the circuit probe server system 135. The circuit probe server system 135 is connected to a program retention device (not shown) which contains the control and testing programs for the tester 110. The circuit probe server system 135 retrieves the control and testing programs for the tester 110.

A merging criteria rule database 140 is connected to the circuit probe server system 135 to provide the criteria for merging the circuit probe result file 116 to the wafer 105 for transfer to the customer. The merging criteria rule database 140, as shown in FIG. 3, contains a trigger part number 205 which identifies the part number of the wafer 105 that has the merged product characterization information data. The merge sort number 210 provides an identification number for the merging rules to be applied to the integrated circuit die formed on the wafer 105. The maximum number of sorting categories or bins for which there are no integrated circuit die on the wafer 105 (NA Max Count) 215 is a limit which when exceeded causes an error message in the merging process. The rule sequence 220 provides the order the merging criteria or rules 225 are to be applied to the sorting of the integrated circuit die of the wafer 105. The merging criteria rules 225 are defined as follows:

$% ("%" is an integer) indicates a Sort bin number (i.e. %1 is Sort 1, %2 is Sort 2 . . . ).

$G indicates Sort good bin. A bin into which fully functional die are assigned.

$O indicates Sort open bin. A bin into which die having open or short circuits are assigned $R indicates Sort repairable bin. A bin into which failing but repairable die are assigned $B indicates Sort bad bin. A bin into which non-repairable die are assigned.

$NA indicates that there isn't any bin on the coordinates. A default bin for die that may have not been tested or for which the tester 110 malfunctioned.

* indicates "don't care what bin it is"—a wild card.

The trigger sort number 230 defines the sorted category or bin number that is to be sorted and the merge bin definition file 235 is the identification of the file which is to be used for the resulting merged product characterization information data. The trigger bin definition file designator 240 defines the file for the product (wafer) 105, the tester type, the sorting parameter designator, and the version of the testing program. The trigger bin definition file designator 240 contains the characterization data for the sorting of the integrated circuit die of the wafer 105. The input sort list 245 provides the sort category or bin definitions that are to be merged and the resulting binning definition of the merge. The input notch list 250 provides an orientation description for the designation of the mapping information of the product test characterization data. A wafer 105 has a notch or some other orientation designator. This input notch list 250 details the orientation of the notch and the quadrant description of the wafer to detail the designation of the integrated circuit die for mapping the product test characterization data.

Figure 4A:
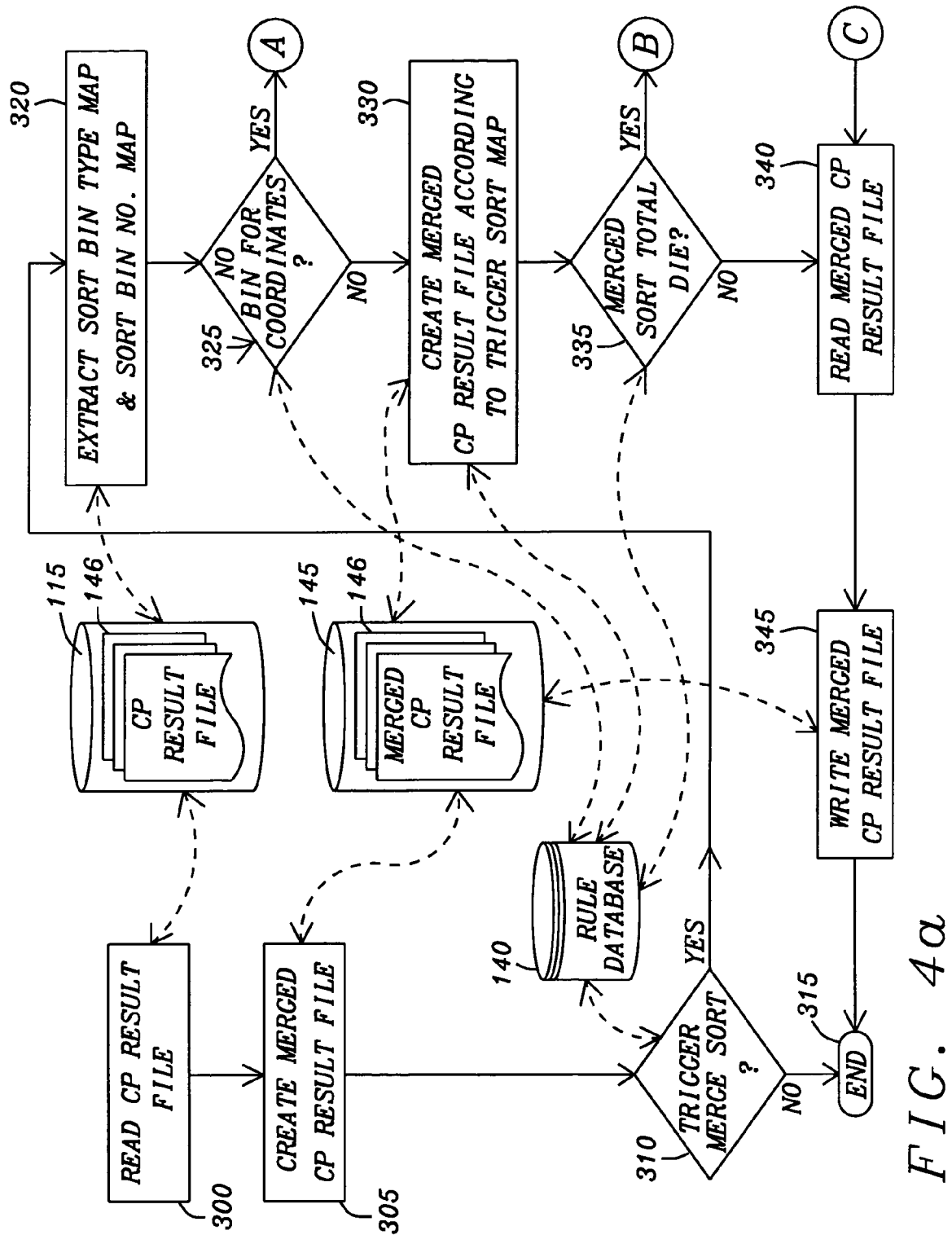
FIGS. 4a and 4b are flow charts of the process for merging of the product characterization information data with a product of this invention.
Figure 4B:
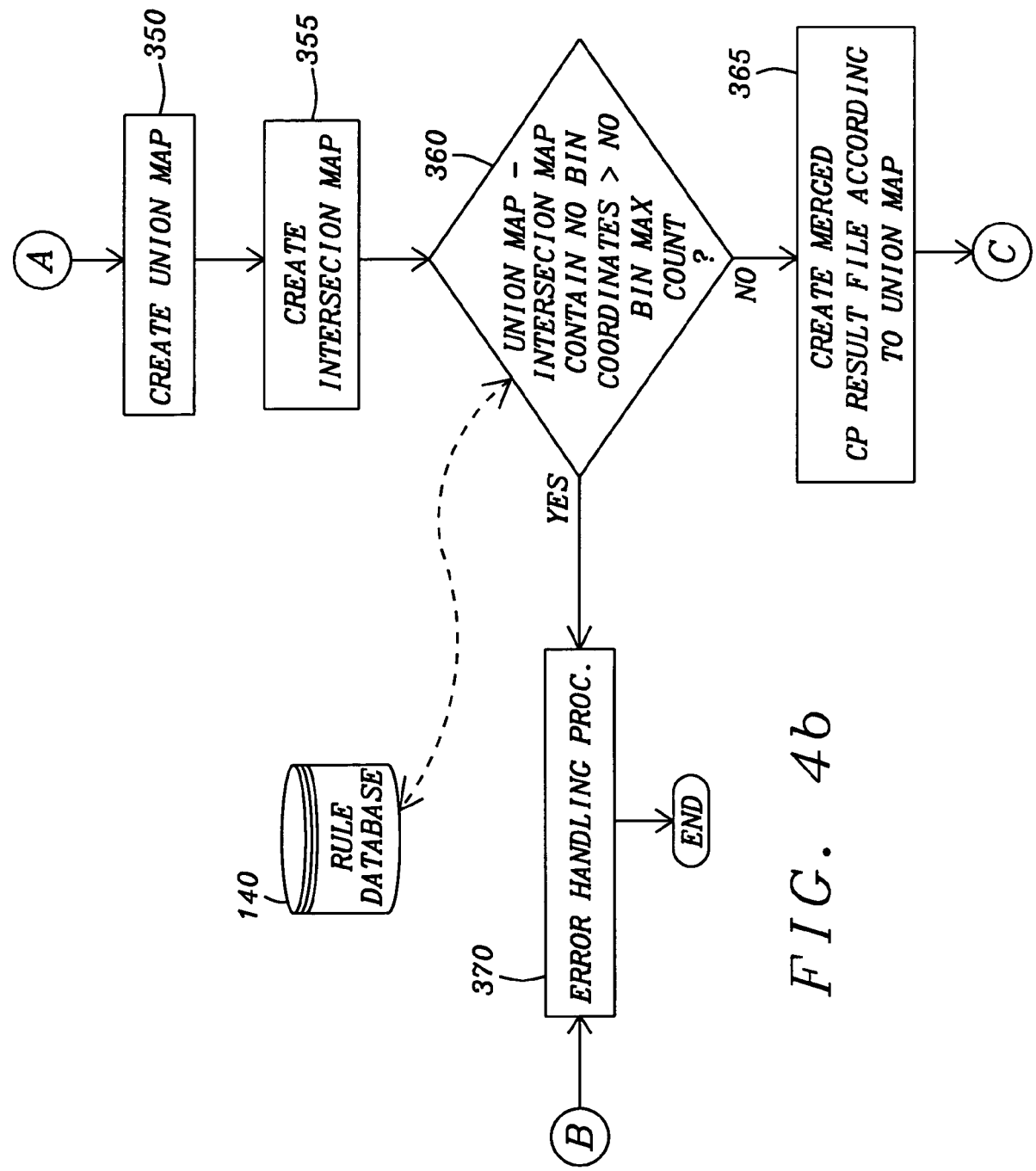

The circuit probe server system 135 performs a program process that is retained on a program retention device connected to the circuit probe server system 135. The program process, when executed, performs the circuit probe server automatic merging process 150 upon the product test characterization data from a circuit probe result file 116 based on the rules from the product test characterization data from the merging criteria rule database 140. The circuit probe server automatic merging process 150 is shown in FIGS. 4a and 4b. The circuit probe server system 135 reads (Box 300) the product test characterization data (CP Result File) 116 from the data retention device 115 and creates (Box 305) a merged result product test characterization data (Merged CP Result File) 146 to the data retention device 145. The trigger part number 205 of the merging criteria rule database 140 is queried (Box 310) to determine whether the part number of the product (wafer) 105 requires a merging sort of the product test characterization data (CP Result File) 116. If not, the process is ended (Box 315).

If a merging sort is required, the sort bin type mapping and the sort bin number mapping is extracted (Box 320) from the product test characterization data (CP Result File) 116.

The merging criteria rules 225 of the merging criteria rule database 140 as shown in FIG. 3 are compared (Box 325) to the sort bin type mapping and the sort bin number mapping to determine whether there are bins for which die may have not been tested or for which the tester 110 malfunctioned ($NA). If there are no such bins, the sorting rule sequence 220, the sorting rules 225 the trigger sort number 230 and the trigger bin definition file designator 240 are extracted from the merging criteria rule database 140. The sort bin type map and the sort bin number map are evaluated according to the sorting rules 225 to create (Box 330) the merged result product test characterization data (Merged CP Result File) 146. FIG. 5d illustrates a form of the sorting rules. In this instance, a wafer is tested by two separate parametric and/or functional criteria (i.e. frequency of operation). The wafer is mapped into a first sort map 400 and a second sort map 405. The customer establishes the trigger sort map 425. In this case, the customer has determined that the die must have passed the sort criteria for both the first sort map 400 and the second sort map 405 or at least the second sort map 405. This means that the merged characterization data must include the die 427 and the die 429 in the merging of the product test characterization data (CP Result File) 116.

The sort bin type mapping and the sort bin number mapping are tested (Box 335) to determine if the total wafer 105 has been merged. If total wafer 105 has been merged, the merged result product test characterization data (Merged CP Result File) 146 is read (Box 340) from a temporary working data retention area and written (Box 345) to the data retention device 145. If the total wafer 105 has not been merged, there is an error in the definition of the sort bin type mapping and the sort bin number mapping and an error handling procedure is initiated (Box 370).

When the merging criteria rules 225 are compared (Box 325) to the sort bin type mapping and the sort bin number mapping and there are bins for which die may not have been tested or for which the tester 110 malfunctioned ($NA), a union map and an intersection map with the results of the testing to the merging criteria or sort bins is created (Boxes 350 and 355). Refer to FIGS. 5a and 5b for a discussion of the union map and the intersection map. FIG. 5a illustrates a union of the results from testing the two sorted bins. A wafer is tested by two separate parametric and/or functional criteria (i.e. frequency of operation). The wafer is mapped onto a first sort map 400 and a second sort map 405. Those die that pass the criteria of the first sort are identified 402 on the first sort map 400 and those die that pass the second sort are identified 406 on the second sort map 405. The union map 410 is created (Box 350) with those die 412 that have passed the criteria of the first sort test and the second sort test, and those die 413 that have passed the first sort test, and those die 414 that have passed the second sort test. FIG. 5b illustrates the intersection of the results of testing for the two sorted bins. In the illustration, the wafer is again mapped onto the first sort map 400 and the second sort map 405. In this instance, the intersection map 415 is created (Box 355) as only those die 417 that have passed the criteria of the first and second sort tests inclusively.

The merging criteria rule database 140 is examined to determine the number of sorting categories or bins for which there are no integrated circuit die on the wafer 105 (NA Max Count) 215. The intersection map is subtracted from the union map to determine the number of sorting categories or bins for which there are no integrated circuit die on the wafer 105. The subtraction is illustrated in the subtraction map 420 of FIG. 5c. The union map 410 and the intersection map 415 are subtracted such that those die that have exclusively passed the criteria of either sort 1 (die 424) or sort 2 (die 422) are identified. In the case of a DRAM this would represent die that had not passed the criteria of sort 1 had been repaired and had passed the criteria of the sort 2. These die 422 and 424 are considered to have no binning available resulting from the merging.

These results of the subtraction are compared (Box 360) to the maximum number of sorting categories or bins for which there are no integrated circuit die on the wafer 105 (NA Max Count) 215 of the merging criteria rule database 140. If the results of the subtraction exceeds the maximum number of sorting categories or bins for which there are no integrated circuit die on the wafer 105 (NA Max Count) 215, the error handling procedure is initiated (Box 370). If the subtraction is not excessive, the merged result product test characterization data (Merged CP Result File) 146 is created (Box 365). The merged result product test characterization data (Merged CP Result File) 146 is read (Box 340) from a temporary working data retention area and written (Box 345) to the data retention device 145.

Returning now to FIG. 2, the product test characterization data (Merged CP Result File) 116 is transferred to be combined with the product (wafer 105) in this instance a wafer ink probe 160. The wafer ink probe 160 marks the wafer 105 to identify those die that have met the criteria of the testing or are to be sorted to specific bins based on their parametric and function testing. The marked wafer 165, which has now been combined with the merged product test characterization data, is transferred to the customer.

While this invention has been particularly shown and described with reference to the preferred embodiments thereof, it will be understood by those skilled in the art that various changes in form and details may be made without departing from the spirit and scope of the invention.

The invention claimed is:

1. A system for merging product characterization information with a characterized product comprising:
   a product characterization database in communication with a product characterizing device to receive said product characterization information for said characterized product;
   a merging rule database describing a merging criteria for merging the product characterization information with said characterized product;
   a merging processor in communication with the product characterization database to receive the product characterization information and the merging rule database to receive said merging criteria to generate merged characterization information by executing the steps of:
      extracting a trigger merging rule from said merging rule database,
      in response to said trigger merging rule having been met to initiate a merging of said product characterization information with said product,
      extracting a merging criteria sort type map and a merging criteria sort number map, whereby said merging criteria sort type map determines which of the products has certain characteristics and said merging criteria sort number map determines which of the products are classified according to grades of said merging criteria; and
      creating a merged product characterization information defined by the grades of said merging criteria.

2. The system for merging product characterization information with the characterized product of claim 1 wherein the merging processor further executes the steps of:
   in response to said products having no characterization that meets said merging criteria, creating a union map for said characterized product, whereby said union map is formed by identifying the characterized product that meets at least one of a plurality of sub-criteria of said merging criteria, and
   creating an intersection map for said characterized product, whereby said intersection map is formed by identifying the characterized product that meets all of the plurality of sub-criteria of said merging criteria; and
   creating merged product characterization information according to said union map.

3. The system for merging product characterization information with the characterized product of claim 2 wherein the merging processor further executes the steps of:
   in response to the union map and the intersection map indicating that a number of said characterized product that does not meet said merging criteria exceeds a predetermined value, initiating an error handling process.

4. The system for merging product characterization information with the characterized product of claim 1 wherein:
   said characterized product is an integrated circuit wafer;
   said product characterization information is integrated circuit wafer tester results, and
   said merged product characterization information is a performance binned sorting of integrated circuit die formed on said integrated circuit wafer.

5. The system for merging product characterization information with the characterized product of claim 4 wherein said merging criteria defines said performance binned sorting of said integrated circuit die.

6. The system for merging product characterization information with the characterized product of claim 1 wherein the merged product characterization information is connected to said product by marking said product to identify said product as having met said merging criteria.

7. A method for merging product characterization information with a characterized product comprising the steps of:
   characterizing product to create said product characterization information;
   communicating said product characterization information to a product characterization database;
   creating a merging criteria to classify said characterized product for receiving said product characterization information;
   placing said merging criteria in a merging rule database; and
   merging the product characterization information according to said merging criteria to create a merged characterization information by executing the steps of:
      extracting a trigger merging rule from said merging rule database,
      determining whether said trigger merging rule has been met to initiate a merging of said product characterization information with said product, and in response to said trigger merging rule being extracting a merging criteria sort type map and a merging criteria sort number map, whereby said merging criteria sort type map determines which of the products has certain characteristics and said merging criteria sort number map determines which of the products are classified according to grades of said merging criteria; and creating a merged product characterization information defined by the grades of said merging criteria.

8. The method for merging product characterization information with the characterized product of claim 7 wherein merging the product characterization information further executes the steps of:

in response to said products having no characterization that meets said merging criteria, creating a union map for said characterized product, whereby said union map is formed by identifying the characterized product that meets at least one of a plurality of sub-criteria of said merging criteria, and creating an intersection map for said characterized product, whereby said intersection map is formed by identifying the characterized product that meets all of the plurality of sub-criteria of said merging criteria; and creating merged product characterization information according to said union map.

9. The method for merging product characterization information with the characterized product of claim 8 wherein merging the product characterization information further executes the steps of:

in response to the union map and the intersection map indicating that a number of said characterized product that does not meet said merging criteria exceeds a predetermined value, initiating an error handling process.

10. The method for merging product characterization information with the characterized product of claim 7 wherein:

said characterized product is an integrated circuit wafer;

said product characterization information is integrated circuit wafer tester results, and said merged product characterization information is a performance binned sorting of integrated circuit die formed on said integrated circuit wafer.

11. The method for merging product characterization information with the characterized product of claim 10 wherein said merging criteria defines said performance binned sorting of said integrated circuit die.

12. The method for merging product characterization information with the characterized product of claim 7 wherein the merged product characterization information is connected to said product by marking said product to identify said product as having met said merging criteria.

13. An apparatus for merging product characterization information with a characterized product comprising:

means for characterizing product to create said product characterization information;

means for communicating said product characterization information to a product characterization database;

means for creating a merging criteria to classify said characterized product for receiving said product characterization information;

means for placing said merging criteria in a merging rule database; and means for merging the product characterization information according to said merging criteria to create a merged characterization information, wherein said characterized product is an integrated circuit wafer, said product characterization information is integrated circuit wafer tester results, and said merged product characterization information is a performance binned sorting of integrated circuit die formed on said integrated circuit wafer.

14. The apparatus for merging product characterization information with the characterized product of claim 13 wherein the means for merging the product characterization information comprising:

means for extracting a trigger merging rule from said merging rule database, means for extracting a merging criteria sort type map and a merging criteria sort number map in response to said trigger merging rule has been met to initiate a merging of said product characterization information with said product, whereby said merging criteria sort type map determines which of the products has certain characteristics and said merging criteria sort number map determines which of the products are classified according to grades of said merging criteria; and means for creating merged product characterization information defined by the grades of said merging criteria.

15. The apparatus for merging product characterization information with the characterized product of claim 14 wherein the means for merging the product characterization information further executes the steps of:

means for initiating an error handling process in response to the union map and the intersection map indicate that a number of said characterized product that does not meet said merging criteria exceeds a predetermined value.

16. The apparatus for merging product characterization information with the characterized product of claim 13 wherein the means for merging the product characterization information further comprises:

means for determining whether said products have no characterization that meets said merging criteria, means for creating a union map for said characterized product, whereby said union map is formed by identifying the characterized product that meets at least one of a plurality of sub-criteria of said merging criteria, and means for creating an intersection map for said characterized product, whereby said intersection map is formed by identifying the characterized product that meets all of the plurality of sub-criteria of said merging criteria; and means for creating merged product characterization information according to said union map.

17. The apparatus for merging product characterization information with the characterized product of claim 13 wherein said merging criteria defines said performance binned sorting of said integrated circuit die.

18. The apparatus for merging product characterization information with the characterized product of claim 13 wherein the merged product characterization information is connected to said product by marking said product to identify said product as having met said merging criteria.

19. A computer integrated manufacturing system that executes a program process that performs a method for merging product characterization information with a characterized product, the program process comprising the steps of:

characterizing product to create said product characterization information;

communicating said product characterization information to a product characterization database;

creating a merging criteria to classify said characterized product for receiving said product characterization information;

placing said merging criteria in a merging rule database; and merging the product characterization information according to said merging criteria to create a merged characterization information, wherein said characterized product is an integrated circuit wafer, said product characterization information is integrated circuit wafer tester results, and said merged product characterization information is a performance binned sorting of integrated circuit die formed on said integrated circuit wafer.

20. The computer integrated manufacturing system of claim 19 wherein merging the product characterization information comprises the steps of:

extracting a trigger merging rule from said merging rule database, determining whether said trigger merging rule has been met to initiate a merging of said product characterization information with said product, in response to said trigger merging rule having been met, extracting a merging criteria sort type map and a merging criteria sort number map, whereby said merging criteria sort type map determines which of the products has certain characteristics and said merging criteria sort number map determines which of the products is classified according to grades of said merging criteria; and creating merged product characterization information defined by the grades of said merging criteria.

21. The computer integrated manufacturing system of claim 19 wherein merging product characterization information further executes the steps of:

in response to said products having no characterization that meets said merging criteria, creating a union map for said characterized product, whereby said union map is formed by identifying the characterized product that meets at least one of a plurality of sub-criteria of said merging criteria, and creating an intersection map for said characterized product, whereby said intersection map is formed by identifying the characterized product that meets all of the plurality of sub-criteria of said merging criteria; and creating merged product characterization information according to said union map.

22. The computer integrated manufacturing system of claim 21 wherein merging product characterization information further executes the steps of:

in response to the union map and the intersection map indicating that a number of said characterized product that does not meet said merging criteria exceeds a predetermined value, initiating an error handling process.

23. The computer integrated manufacturing system of claim 19 wherein said merging criteria defines said performance binned sorting of said integrated circuit die.

24. The computer integrated manufacturing system of claim 19 wherein the merged product characterization information is connected to said product by marking said product to identify said product as having met said merging criteria.

25. A system for merging integrated circuit testing characterization data with characterized integrated circuit wafers comprising:

an integrated circuit characterization database in communication with an integrated circuit wafer testing device to receive said integrated circuit testing characterization data for said characterized integrated circuit wafers;

a merging rule database describing a merging criteria for merging integrated circuit testing characterization data with said characterized integrated circuit wafers;

a merging processor in communication with the product characterization database to receive the integrated circuit testing characterization data and the merging rule database to receive said merging criteria to generate merged characterization information results by executing the steps of:

extracting a trigger merging rule from said merging rule database, determining whether said trigger merging rule has been met to initiate a merging of said integrated circuit testing characterization data with said product, in response to said trigger merging rule having been met, extracting a merging criteria sort type map and a merging criteria sort number map, whereby said merging criteria sort type map determines which of the products has certain characteristics and said merging criteria sort number map determines which of the products is classified according to grades of said merging criteria; and creating merged integrated circuit testing characterization data defined by the grades of said merging criteria.

26. The system for merging integrated circuit testing characterization data with characterized integrated circuit wafers of claim 25 wherein:

said merged integrated circuit testing characterization data is a performance binned sorting of integrated circuit die formed on said integrated circuit wafer.

27. The system for merging integrated circuit testing characterization data with characterized integrated circuit wafers of claim 26 wherein said merging criteria defines said performance binned sorting of said integrated circuit die.

28. The system for merging integrated circuit testing characterization data with characterized integrated circuit wafers of claim 25 wherein the merged integrated circuit testing characterization data is connected to said product by marking said product to identify said product as having met said merging criteria.

29. The system for merging integrated circuit testing characterization data with characterized integrated circuit wafers of claim 25 wherein the merging processor further executes the steps of:

in response to said products having no characterization that meets said merging criteria, creating a union map for said characterized integrated circuit wafers, whereby said union map is formed by identifying the characterized integrated circuit wafers that meets at least one of a plurality of sub-criteria of said merging criteria, and creating an intersection map for said characterized integrated circuit wafers, whereby said intersection map is formed by identifying the characterized integrated circuit wafers that meets all of the plurality of sub-criteria of said merging criteria; and creating merged integrated circuit testing characterization data according to said union map.

30. The system for merging integrated circuit testing characterization data with characterized integrated circuit wafers of claim 29 wherein the merging processor further executes the steps of:
in response to the union map and the intersection map indicating that a number of said characterized product that does not meet said merging criteria exceeds a predetermined value, initiating an error handling process.

31. A method for the merging integrated circuit testing characterization data with a characterized integrated circuit wafers comprising the steps of:
characterizing integrated circuit to create said integrated circuit testing characterization data;
communicating said integrated circuit testing characterization data to a integrated circuit characterization database;
creating a merging criteria to classify said characterized integrated circuit wafer for receiving said integrated circuit testing characterization data;
placing said merging criteria in a merging rule database; and
merging the integrated circuit testing characterization data according to said merging criteria to create a merged integrated circuit characterization data result by executing the steps of:
extracting a trigger merging rule from said merging rule database,
determining whether said trigger merging rule has been met to initiate a merging of said integrated circuit testing characterization data with said integrated circuit wafer,
in response to said trigger merging rule having been met, extracting a merging criteria sort type map and a merging criteria sort number map, whereby said merging criteria sort type map determines which of the integrated circuit has certain characteristics and said merging criteria sort number map determines which of the integrated circuit wafers is classified according to grades of said merging criteria; and
creating merged integrated circuit testing characterization data defined by the grades of said merging criteria.

32. The method for merging integrated circuit testing characterization data with characterized integrated circuit wafers of claim 31 wherein the merging the integrated circuit testing characterization data further executes the steps of:
in response to said integrated circuit testing having no characterization that meets said merging criteria,
creating a union map for said characterized integrated circuit wafer, whereby said union map is formed by identifying the characterized integrated circuit dice of said integrated circuit wafer that meets at least one of a plurality of sub-criteria of said merging criteria, and
creating an intersection map for said characterized integrated circuit wafer, whereby said intersection map is formed by identifying the characterized integrated circuit die of the integrated circuit wafer that meets all of the plurality of sub-criteria of said merging criteria; and
creating a the merged integrated circuit testing characterization data according to said union map.

33. The method for merging integrated circuit testing characterization data with characterized integrated circuit wafers of claim 32 wherein merging the integrated circuit testing characterization data further executes the steps of:
in response to the union map and the intersection map indicating that a number of said characterized product that does not meet said merging criteria exceeds a predetermined value, initiating an error handling process.

34. The method for merging integrated circuit testing characterization data with characterized integrated circuit wafer of claim 32 wherein:
said merged integrated circuit testing characterization data is a performance binned sorting of integrated circuit die formed on said integrated circuit wafer.

35. The method for merging integrated circuit testing characterization data with characterized integrated circuit wafers of claim 34 wherein said merging criteria defines said performance binned sorting of said integrated circuit die.

36. The method for merging integrated circuit testing characterization data with characterized integrated circuit wafers of claim 32 wherein the merged integrated circuit testing characterization data is connected to said integrated circuit die by marking said integrated circuit die to identify said integrated circuit die as having met said merging criteria.

* * * * *